(12) United States Patent
McNamee et al.

(10) Patent No.: US 6,645,655 B1
(45) Date of Patent: Nov. 11, 2003

(54) PASSIVELY PUMPED LIQUID FEED FUEL CELL SYSTEM

(75) Inventors: George C. McNamee, Loudonville, NY (US); William P. Acker, Rexford, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 211 days.

(21) Appl. No.: 09/717,754

(22) Filed: Nov. 21, 2000

(51) Int. Cl.[7] .......................... H01M 8/00; H01M 8/04; H01M 8/12; H01M 8/10; H01M 2/14
(52) U.S. Cl. .............. 429/30; 429/12; 429/13; 429/25; 429/39
(58) Field of Search ............... 429/12, 13, 25, 429/30, 39; 417/393

(56) References Cited

U.S. PATENT DOCUMENTS

| | | |
|---|---|---|
| 4,572,876 A | 2/1986 | Spurrier |
| 4,673,624 A | 6/1987 | Hockaday ............... 429/41 |
| 4,810,597 A | 3/1989 | Kumagai et al. .......... 429/22 |
| 5,316,869 A * | 5/1994 | Perry et al. ............. 429/19 |
| 5,523,177 A | 6/1996 | Kosek et al. ............. 429/40 |
| 5,573,866 A | 11/1996 | Van Dine et al. .......... 429/13 |
| 5,599,638 A | 2/1997 | Surampudi et al. ......... 429/33 |
| 5,631,099 A * | 5/1997 | Hockaday ............... 427/105 |
| 5,664,940 A * | 9/1997 | Du ..................... 417/393 |
| 5,723,228 A | 3/1998 | Okamoto ............... 429/12 |
| 5,759,712 A | 6/1998 | Hockaday ............... 429/30 |
| 5,766,786 A | 6/1998 | Fleck et al. ............. 429/17 |
| 5,773,162 A | 6/1998 | Surampudi et al. ......... 429/39 |
| 5,795,668 A | 8/1998 | Banerjee ............... 429/33 |
| 5,833,439 A * | 11/1998 | Du ..................... 417/393 |
| 5,916,699 A | 6/1999 | Thomas et al. ............ 429/3 |
| 5,945,231 A | 8/1999 | Narayanan et al. ........ 429/30 |
| 5,992,008 A | 11/1999 | Kindler ................. 29/730 |
| 6,106,964 A * | 8/2000 | Voss et al. .............. 429/13 |
| 6,146,781 A | 11/2000 | Surampudi et al. | |
| 6,416,895 B1 * | 7/2002 | Voss et al. .............. 429/20 |

FOREIGN PATENT DOCUMENTS

| | | |
|---|---|---|
| GB | 1114489 A | 5/1968 |
| GB | 2010385 A | 6/1979 |
| WO | WO 01-54216 A2 | 7/2001 |

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering.
"Polymer Electrolyte Fuel Cells as Potential Power Sources for Portable Electronic Devices", Shinshon Gottesfeld and Mahlon S. Wilson, pp. 487–517.
International Search Report for International Patent Application, Ser. No. PCT/US 01–43417, Filed Jul. 11, 2001, all pages.

* cited by examiner

*Primary Examiner*—Carol Chaney
*Assistant Examiner*—Donald V. Scaltrito
(74) *Attorney, Agent, or Firm*—Cesari and McKenna, LLP

(57) ABSTRACT

A direct methanol fuel cell (DMFC) system is provided with a pump for pumping methanol into the cell. The pump is driven by carbon dioxide produced by the electrochemical reaction at the anode of the fuel cell. Because the amount of $CO_2$ generated is proportional to the power generated by the cell, and thus the amount of fuel demanded by the cell, the pump is self-regulating. The system may be integrated using microelectromechanical system fabrication techniques.

18 Claims, 3 Drawing Sheets

PASSIVELY PUMPED LIQUID FEED FUEL CELL SYSTEM

BACKGROUND OF THE INVENTION

1. Field of the Invention

The present invention relates generally to the field of fuel cells and, more specifically, to a direct methanol fuel cell system in which carbon dioxide generated by the electrochemical reaction is used to drive a pump which pumps fuel into the system.

2. Background Information

Fuel cells are devices in which an electrochemical reaction is used to generate electricity. A variety of materials may be suitable for use as a fuel, depending upon the materials chosen for the components of the cell. Organic materials, such as methanol or formaldehyde, are attractive choices for fuels due to their high specific energies.

Fuel cell systems may be divided into "reformer based" (i.e., those in which the fuel is processed in some fashion before it is introduced into the cell) or "direct oxidation" in which the fuel is fed directly into the cell without internal processing. Most currently available fuel cells are of the reformer-based type, and their fuel processing requirement limits their application to relatively large applications relative to direct oxidation systems.

An example of a direct oxidation system is the direct methanol fuel cell system or DMFC. In a DMFC, the electrochemical reaction at the anode is a conversion of methanol and water to $CO_2$, $H^+$ and $e^-$. The hydrogen ions flow through a membrane electrolyte to the cathode, while the free electrons flow through a load which is normally connected between the anode and cathode. The carbon dioxide, which is essentially waste, is separated from the remaining methanol fuel and vented before such fuel is recirculated. At the cathode, oxygen reacts with hydrogen ions and free electrons to form water.

Many DMFC designs rely on a simple gravity feed to draw methanol from a source and introduce it into the anode. Two disadvantages of the gravity feed are that it is difficult to vary the flow of methanol into the fuel cell system in response to changes in demand for power, and operation may be interrupted when the system is moved or oriented such that fuel does not flow smoothly. These are significant disadvantages in applications that have a variable load or which are expected to operate in situations where orientation is variable, such as consumer electronic devices, in which DMFCs may be candidates to replace batteries as the power source. Other DMFC designs rely on motorized pumps to pump the methanol into the cell. However, the use of such pumps may bring intolerable increases in size or weight, and will increase the cost of manufacturing and cost of operation due to the electricity or other energy needed to drive the pump. The parasitic power loss used to drive the pump decreases efficiency and will therefore decrease the operation time of the system, and decrease the effective output of such a system.

SUMMARY OF THE INVENTION

The present invention provides a fuel cell system in which fuel is circulated by a pump driven by a gas produced naturally as part of the electrochemical reaction. In a preferred embodiment, a fuel cell system is provided in which the methanol fuel is pumped by a pump driven by carbon dioxide generated at the anode. The pump receives methanol fuel from a source and water from a gas separator which separates the effluent from the cathode into water and air. Effluent from the anode is directed through another gas separator which separates methanol and water as liquids from the carbon dioxide gas. The separated liquids and gas are then passed to the fuel pump where the $CO_2$ is used to drive the pump.

Because the amount Of $CO_2$ generated by the fuel cell is proportional to the power generated and, in turn, the demand for fuel, the fuel pump is self-regulating. That is, as more power is demanded, more $CO_2$ is produced, which results in the fuel pump delivering more fuel to the cell. Conversely, as power demand decreases, less $CO_2$ is produced by the fuel cell, which in turn decreases the amount of fuel pumped to the cell. As the $CO_2$ used to drive the pump is produced naturally as part of the fuel cell's operation, there is no parasitic power loss caused by the pump's operation, and the fuel cell system's operating time is not decreased. In addition, all or most of the components of the system may be fabricated using microelectromechanical system techniques, thus providing a compact, highly integrated system.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
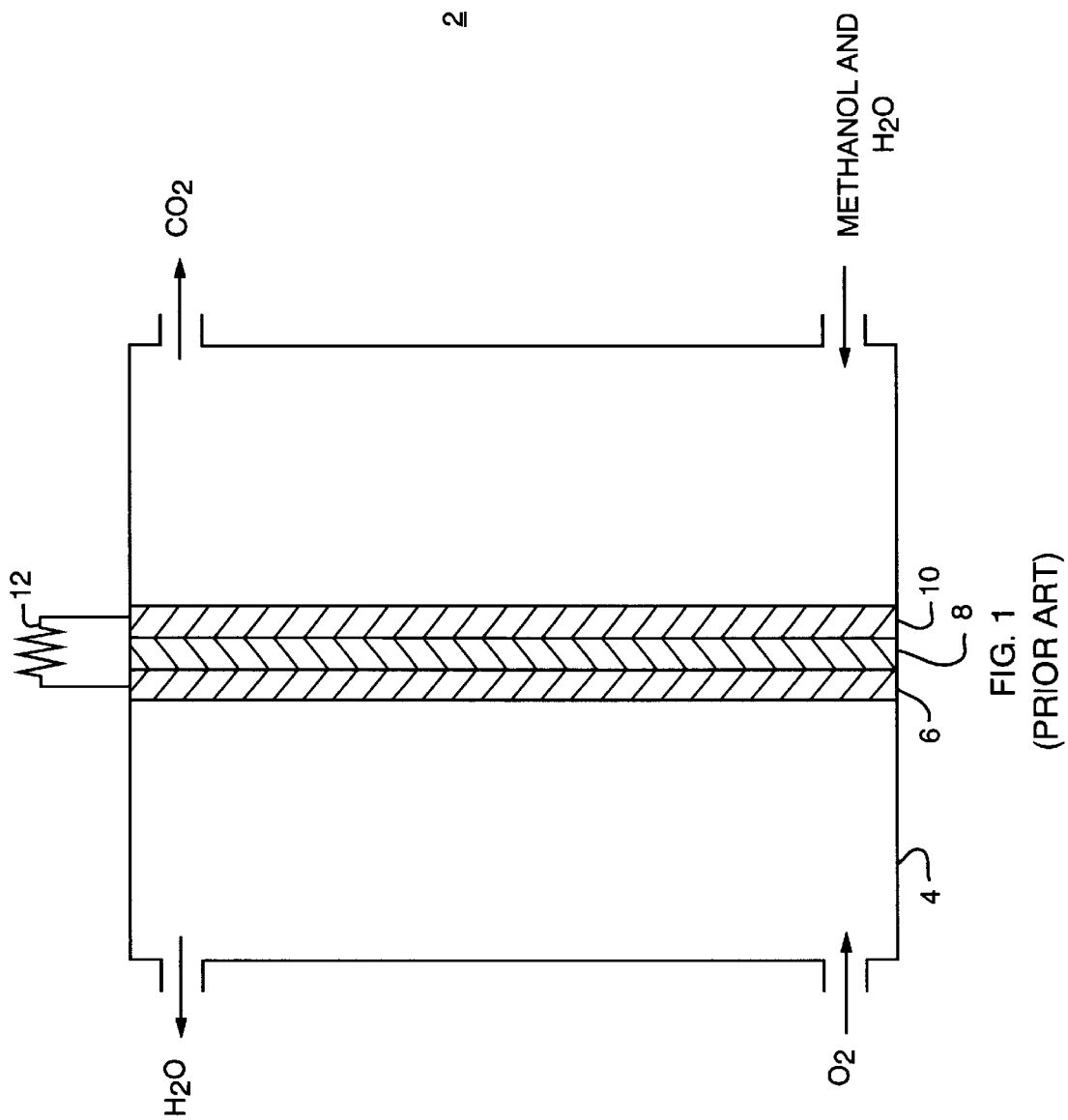
FIG. 1 is a block diagram of a direct methanol fuel cell known in the prior art.

FIG. 1 shows a conventional direct methanol fuel cell 2 in which a housing 4 encloses a cathode 6, a membrane electrolyte 8 and an anode 10. A load 12 is connected across cathode 6 and anode 10. Methanol and water are introduced into the anode side of housing 4 while oxygen is introduced into the cathode side of the housing. The source of the oxygen is preferably ambient air, but it should be understood that other sources could be used. As a result of the reactions at the anode and cathode, free electrons flow from anode 10 through load 12 to cathode 6, while hydrogen ions flow from anode 10 through membrane electrolyte 8 to cathode 6. So long as the reactions continue, a current is maintained through load 12.

Figure 2:
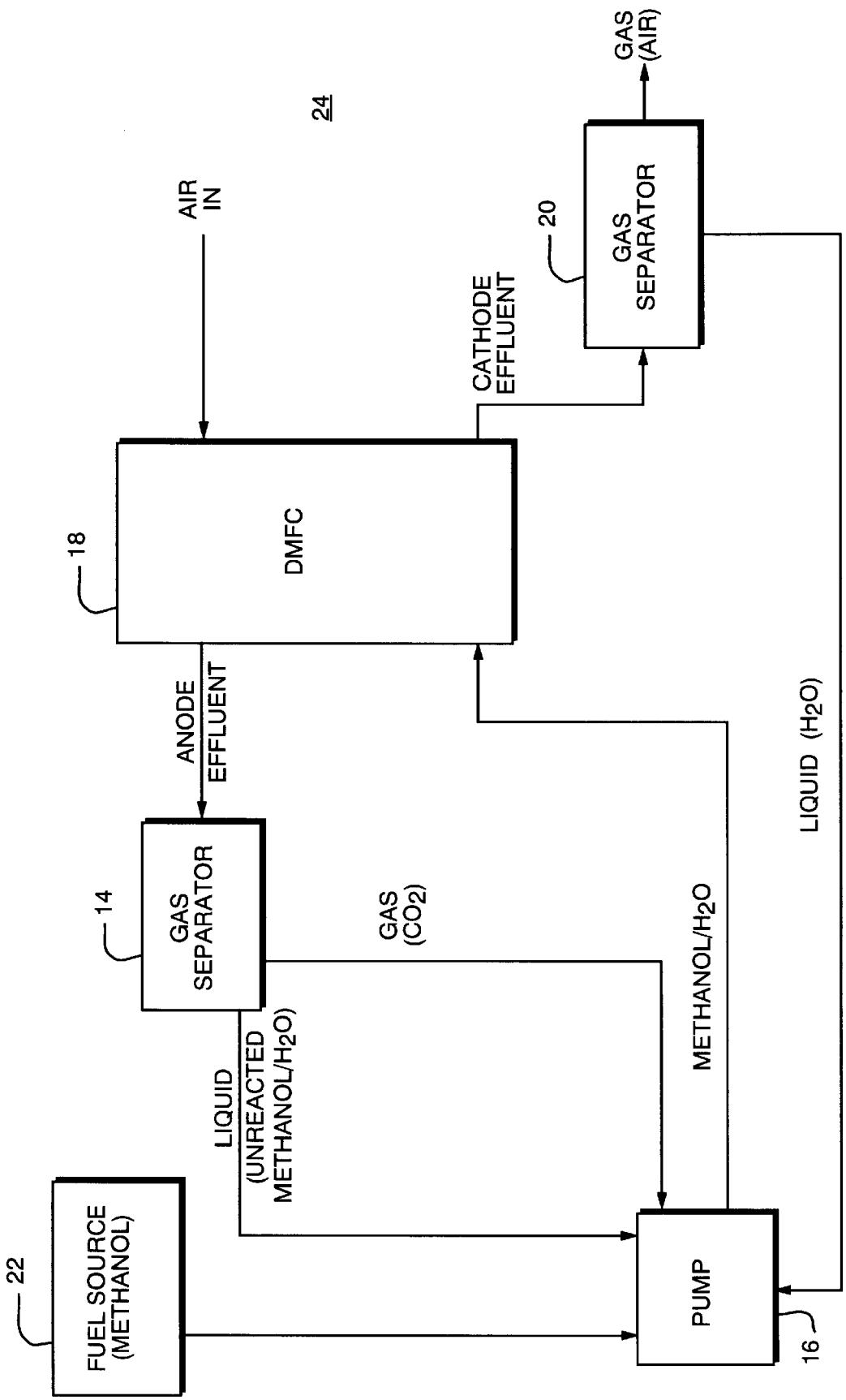
FIG. 2 is a schematic diagram of a passively-pumped, direct methanol fuel cell system constructed in accordance with a preferred embodiment of the present invention.

FIG. 2 shows a passively-pumped, direct methanol fuel cell system 24 constructed in accordance with one aspect of the invention. A fuel source 22 contains fuel (methanol) which is supplied to a pump 16. Pump 16 is coupled to a first gas separator 14, a direct methanol fuel cell 18, and a second gas separator 20. Gas separator 14 receives effluent from the anode of fuel cell 18 and separates it into liquid (i.e., unreacted methanol and water) and gas (carbon dioxide) components. The liquid component is supplied to pump 16 for recirculation to fuel cell 18. The gas component is also supplied to pump 16 and is used to drive the pump.

Gas separator 20 receives effluent from the cathode of fuel cell 18 and separates the effluent into liquid (water), which is returned to pump 16 for recirculation to the fuel cell, and gas (air) which is vented to the ambient.

Fuel cell 18 may be constructed in a conventional manner, like that shown in FIG. 1, from a variety of materials which are commercially available and may be constructed using MEMS fabrication techniques, conventional techniques or a combination of both. Similarly, gas separators 14 and 20 may be of a conventional design and constructed using similar techniques. Alternatively, gas separator 20 could also be implemented using a microfluidic tube, a wicking agent or combination thereof which functions to remove liquid effluent and allow it to be evaporated.

Figure 3:
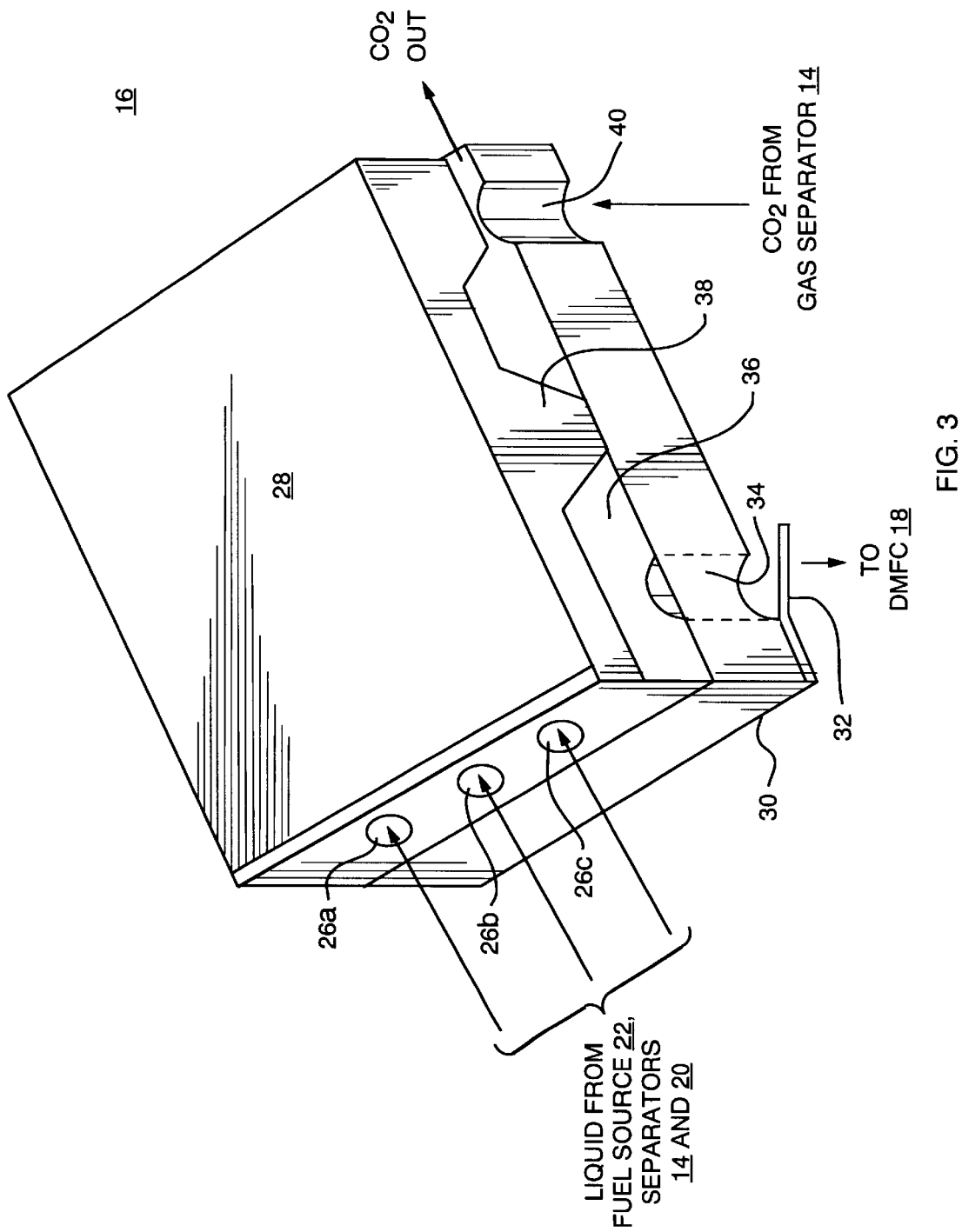
FIG. 3 is a diagram of one embodiment of the pump shown in FIG. 2 in which the pump is constructed using microelectromechanical system (MEMS) fabrication techniques.

FIG. 3 shows one embodiment of pump 16 which is preferably constructed using MEMS fabrication techniques. Three inlets 26a, 26b and 26c admit liquids from fuel source 22 and gas separators 14 and 20 to a pumping chamber 36. An actuator 28 is mounted on a base 30 and pivots about a central support 38. Thus, when $CO_2$ is introduced through an aperture 40 and exerts an upward force on the end of actuator 28 which is proximate to aperture 40, actuator 28 pivots about support 22. The movement of actuator 28 effectively reduces the volume of pumping chamber 36, thereby forcing a methanol/water mixture downward through outlet 34, past a closing flap 32 and on to fuel cell 18.

As the methanol/water mixture is forced out of pumping chamber 36, $CO_2$ is vented along the edge of actuator 28, thus decreasing pressure and allowing actuator 28 to pivot in the opposite direction and return to its original position. At that point, the pumping cycle may begin again.

Inlets 26a, 26b and 26c may be fitted with check valves to prevent backflow of the methanol/water mixture which would undermine effective pumping action. Those inlets may also be fitted with metering valves to permit precise control of the amounts of methanol and water which enter the pumping chamber 36. Such check valves and metering valves are preferably constructed using MEMS fabrication techniques.

It should be understood by those skilled in the art that different types of pumps or combinations of pumps could be used with the invention. For example, a diaphragm or other cantilevered pump, again preferably fabricated using MEMS techniques, could be used in addition to the gas-driven pump described above. In addition, components such as gas separator 14 and pump 16 may be combined into an integrated unit which may reduce the overall size or improve the form factor of the fuel cell system.

It should also be understood that the present invention may be used with fuels other than a methanol/water mixture including, for example, pure methanol, and that gases other than carbon dioxide could be used to drive the pump.

What is claimed is:

1. A passively-pumped direct methanol fuel cell system comprising:
   an anode, a cathode, and a membrane electrolyte disposed between the anode and cathode;
   a source of air or oxygen coupled to the cathode;
   a source of methanol;
   a first gas separator coupled to the anode for separating effluent from the anode into methanol and water as liquids and carbon dioxide as gas;
   a second gas separator coupled to the cathode for separating effluent from the cathode into water and air; and
   a pump coupled to the source of methanol, the first and second gas separators and the anode, said pump being driven by said separated carbon dioxide and operating to pump methanol and water to said anode.

2. The fuel cell system as in claim 1 wherein said pump is constructed using microelectromechanical system (MEMS) fabrication techniques.

3. The fuel cell system as in claim 2 wherein said pump includes an actuator pivotally mounted on a base, a pumping chamber enclosed by said actuator and base, one or more inlets arranged to admit methanol and water or a methanol/water mixture into said chamber, an outlet for discharging fluid from said chamber to said anode, and an aperture for directing said separated carbon dioxide to said actuator so as to drive said pump.

4. The fuel cell system as in claim 3 wherein one or more of said inlets includes a check valve for preventing the backflow of fluid from said pumping chamber.

5. The fuel cell system as in claim 3 wherein one or more of said inlets includes a metering valve for controlling the flow of fluid into said pumping chamber.

6. The fuel cell system as in claim 1 wherein said system is constructed using MEMS fabrication techniques.

7. The fuel cell system as in claim 1 wherein said system is constructed using a combination of MEMS and non-MEMS fabrication techniques.

8. A method of passively pumping a direct methanol fuel cell system comprising:
   providing a gas-driven pump coupled to a source of methanol, a source of water and said fuel cell;
   separating carbon dioxide from an effluent drawn from an anode of said fuel cell; and
   using said carbon dioxide to drive said pump.

9. The method as in claim 8 wherein said anode effluent is passed through a gas separator which separates unreacted methanol and water from said carbon dioxide.

10. The method as in claim 8 wherein effluent from a cathode of said fuel cell is passed through a gas separator which separates water from air, and said separated water is used as the water source for said pump.

11. The method as in claim 8 wherein said pump is constructed using MEMS fabrication techniques.

12. The method as in claim 8 wherein said pump is constructed using a combination of MEMS and non-MEMS fabrication techniques.

13. The method as in claim 11 wherein said pump includes one or more inlets for admitting methanol and water or a methanol/water mixture and one or more of said inlets includes a check valve for preventing backflow of fluid from said pump.

14. The method as in claim 13 wherein one or more of said inlets includes a metering valve for controlling the amounts of methanol and water or methanol/water mixture admitted into said pump.

15. A method of pumping a direct oxidation fuel cell system comprising:
   providing a gas-driven pump coupled to a source of fuel and said fuel cell;
   separating a gas from an effluent drawn from said fuel cell; and
   using said separated gas to drive said pump.

16. The method as in claim 13 wherein said pump is constructed using MEMS fabrication techniques.

17. The method as in claim 14 wherein said pump includes one or more inlets for admitting fuel from said fuel source and one or more of said inlets includes a check valve for preventing backflow of said fuel.

18. The method as in claim 13 wherein said pump is constructed using a combination of MEMS and conventional fabrication techniques.

* * * * *